United States Patent
Bai et al.

(10) Patent No.: US 11,502,797 B2
(45) Date of Patent: Nov. 15, 2022

(54) EFFICIENT UPDATE AND ACTIVATION OF CHANNEL STATE INFORMATION (CSI)-REFERENCE SIGNAL (RS) TRIGGER STATE

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/114,026

(22) Filed: Dec. 7, 2020

(65) Prior Publication Data

US 2021/0184810 A1    Jun. 17, 2021

Related U.S. Application Data

(60) Provisional application No. 62/948,525, filed on Dec. 16, 2019.

(51) Int. Cl.
*H04L 5/00*         (2006.01)
*H04W 72/04*        (2009.01)

(52) U.S. Cl.
CPC ......... *H04L 5/0048* (2013.01); *H04W 72/042* (2013.01)

(58) Field of Classification Search
CPC .......................... H04L 5/0048; H04W 72/042
See application file for complete search history.

(56) References Cited

U.S. PATENT DOCUMENTS

| | | | | |
|---|---|---|---|---|
| 2019/0174466 A1* | 6/2019 | Zhang | ..................... | H04L 5/005 |
| 2019/0215870 A1* | 7/2019 | Babaei | ..................... | H04L 5/001 |
| 2020/0412506 A1* | 12/2020 | Määttanen | ............ | H04L 5/0051 |
| 2021/0028843 A1* | 1/2021 | Zhou | ..................... | H04B 7/0626 |

FOREIGN PATENT DOCUMENTS

WO    WO-2017190273 A1    11/2017

OTHER PUBLICATIONS

International Search Report and Written Opinion—PCT/US2020/063791—ISA/EPO—dated Mar. 5, 2021.

(Continued)

*Primary Examiner* — Ronald B Abelson
(74) *Attorney, Agent, or Firm* — Shumaker & Sieffert, P.A.

(57) ABSTRACT

Certain aspects of the present disclosure are directed to a method for wireless communication. The method generally includes receiving a configuration of trigger states for channel state information (CSI)-reference signal (RS) reporting, receiving a first downlink control information (DCI) activating one of the trigger states, receiving CSI-RS in accordance with the activated one of the trigger states, and processing the CSI-RS.

26 Claims, 10 Drawing Sheets

(56) References Cited

OTHER PUBLICATIONS

ZTE, et al., "Remaining Details on CSI Measurement", 3GPP TSG RAN WG1 Meeting #91, 3GPP Draft; R1-1719531 Remaining Details on CSI Measurement, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 27, 2017-Dec. 1, 2017, Nov. 18, 2017 (Nov. 18, 2017), 7 Pages, XP051369345, Retrieved from the Internet: URL: http://www.3gpp.org/ftp/tsg%5Fran/WG1%5FRL1/TSGR1%5F91/Docs/ [retrieved on Nov. 18, 2017] the whole document.
ZTE, et al., "TEI Proposal: on Aperiodic CSI/CSI-RS", 3GPP TSG RAN WG1 Meeting #98, 3GPP Draft; R1-1909541 TEI Proposal on Aperiodic CSI and CSI-RS, 3rd Generation Partnership Project (3GPP), Mobile Competence Centre; 658, Route Des Lucioles; F-06921 Sophia-Antipolis Cedex; France, vol. RAN WG1, No. Prague, CZ; Aug. 26, 2019-Aug. 30, 2019, Sep. 3, 2019 (Sep. 30, 2019), 4 Pages, XP051766141, Retrieved from the Internet: URL: http://www.3gpp.org/ftp/tsg_ran/WG1_RL1/TSGR1_98/Docs/R1-1909541.zip [retrieved on Sep. 3, 2019] the whole document.
ZTE: "Leftover Issues on Aperiodic CSI-RS", 3GPP TSG RAN WG1 Meeting #97, 3GPP Draft; R1-1906252 Leftover Issues on Aperiodic CSI-RS, 3rd Generation Partnership Project (3GPP), Mobile Competence Centre; 650, Route Des Lucioles; F-06921 Sophia-Antipolis Cedex, France, vol. RAN WG1, No. Reno, USA; May 13, 2019-May 17, 2019, May 13, 2019 (May 13, 2019), 4 Pages, XP051727705, Retrieved from the Internet: URL: http://www.3gpp.org/ftp/Meetings%5F3GPP%5FSYNC/RAN1/Docs/R1%2D1906252%2Ezip [retrieved on May 13, 2019] the whole document.

* cited by examiner

EFFICIENT UPDATE AND ACTIVATION OF CHANNEL STATE INFORMATION (CSI)-REFERENCE SIGNAL (RS) TRIGGER STATE

CROSS-REFERENCE TO RELATED APPLICATION

This application claims benefit of and priority to U.S. Provisional Application No. 62/948,525, filed Dec. 16, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for trigger state configuration and activation.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes.

Certain aspects of the present disclosure are directed to a method for wireless communication. The method generally includes receiving a configuration of trigger states for channel state information (CSI)-reference signal (RS) reporting, receiving a first downlink control information (DCI) activating one of the trigger states, receiving the CSI-RS in accordance with the activated one of the trigger states; and processing the CSI-RS.

Certain aspects of the present disclosure are directed to a method for wireless communication. The method generally includes transmitting a configuration of trigger states for CSI-RS reporting, and transmitting a first DCI activating one of the trigger states.

Certain aspects of the present disclosure are directed to a method for wireless communication. The method generally includes receiving a configuration of trigger states for CSI-RS reporting, receiving an indication of an update of one or more parameters for at least one of the trigger states, receiving the CSI-RS in accordance with the at least one of the trigger states having the updated one or more parameters; and processing the CSI-RS.

Certain aspects of the present disclosure are directed to a method for wireless communication. The method generally includes transmitting a configuration of trigger states for CSI-RS reporting, and transmitting an indication of an update of one or more parameters for at least one of the trigger states.

Certain aspects of the present disclosure are directed to an apparatus for wireless communication. The apparatus generally includes a memory, and one or more processors coupled to the memory, the one or more processors and the memory being configured to receive a configuration of trigger states for CSI-RS reporting, receive a first DCI activating one of the trigger states, receive CSI-RS in accordance with the activated one of the trigger states; and processing the CSI-RS.

Certain aspects of the present disclosure are directed to an apparatus for wireless communication. The apparatus generally includes a memory, and one or more processors coupled to the memory, the one or more processors and the memory being configured to transmit a configuration of trigger states for CSI-RS reporting, transmit a first DCI activating one of the trigger states, and receive CSI-RS feedback in accordance with the activated one of the trigger states.

Certain aspects of the present disclosure are directed to an apparatus for wireless communication. The apparatus generally includes a memory, and one or more processors coupled to the memory, the one or more processors and the memory being configured to receive a configuration of trigger states for CSI-RS reporting, receive an indication of an update of one or more parameters for at least one of the trigger states, receive CSI-RS in accordance with the at least one of the trigger states having the updated one or more parameters, and process the CSI-RS.

Certain aspects of the present disclosure are directed to an apparatus for wireless communication. The apparatus generally includes a memory, and one or more processors coupled to the memory, the one or more processors and the memory being configured to transmit a configuration of trigger states for CSI-RS reporting, and transmit an indication of an update of one or more parameters for at least one of the trigger states.

Certain aspects of the present disclosure are directed to an apparatus for wireless communication. The apparatus generally includes means for receiving a configuration of trigger states for CSI-RS reporting, means for receiving a first DCI activating one of the trigger states, means for receiving CSI-RS in accordance with the activated one of the trigger states; and means for processing the CSI-RS.

Certain aspects of the present disclosure are directed to an apparatus for wireless communication. The apparatus generally includes means for transmitting a configuration of trigger states for CSI-RS reporting, and means for transmitting a first DCI activating one of the trigger states.

Certain aspects of the present disclosure are directed to an apparatus for wireless communication. The apparatus generally includes means for receiving a configuration of trigger states for CSI-RS reporting, means for receiving an indication of an update of one or more parameters for at least one of the trigger states, and means for receiving CSI-RS in accordance with the at least one of the trigger states having the updated one or more parameters; and means for processing the CSI-RS.

Certain aspects of the present disclosure are directed to an apparatus for wireless communication. The apparatus generally includes means for transmitting a configuration of trigger states for CSI-RS reporting, and means for transmitting an indication of an update of one or more parameters for at least one of the trigger states.

Certain aspects of the present disclosure are directed to a computer-readable medium having instructions stored thereon for receiving a configuration of trigger states for CSI-RS reporting, receiving a first DCI activating one of the trigger states, receiving the CSI-RS in accordance with the activated one of the trigger states, and processing the CSI-RS.

Certain aspects of the present disclosure are directed to a computer-readable medium having instructions stored thereon for transmitting a configuration of trigger states for CSI-RS reporting, and transmitting a first DCI activating one of the trigger states.

Certain aspects of the present disclosure are directed to a computer-readable medium having instructions stored thereon for receiving a configuration of trigger states for CSI-RS reporting, receiving an indication of an update of one or more parameters for at least one of the trigger states, receiving the CSI-RS in accordance with the at least one of the trigger states having the updated one or more parameters; and processing the CSI-RS.

Certain aspects of the present disclosure are directed to a computer-readable medium having instructions stored thereon for transmitting a configuration of trigger states for CSI-RS reporting, and transmitting an indication of an update of one or more parameters for at least one of the trigger states.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for downlink control information (DCI)-based trigger state activation, and dynamic trigger state updating. For example, to reduce trigger state activation latency, DCI may be used to activate a trigger state that is configured (e.g., preconfigured) using radio resource control (RRC) signaling. The activated trigger state may be used for channel state information (CSI)-reference signal (RS) reporting. In certain aspects, DCI or medium access control (MAC)-control element (CE) may be used to dynamically update one or more parameters of at least one of the trigger states. In other words, instead of configuring new trigger states in response to variations in channel conditions, DCI or MAC-CE may be transmitted to a UE to update one or more parameters of at least one trigger state to be used for CSI-RS reporting.

The following description provides examples of DCI-based trigger state activation and dynamic updating of trigger states in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
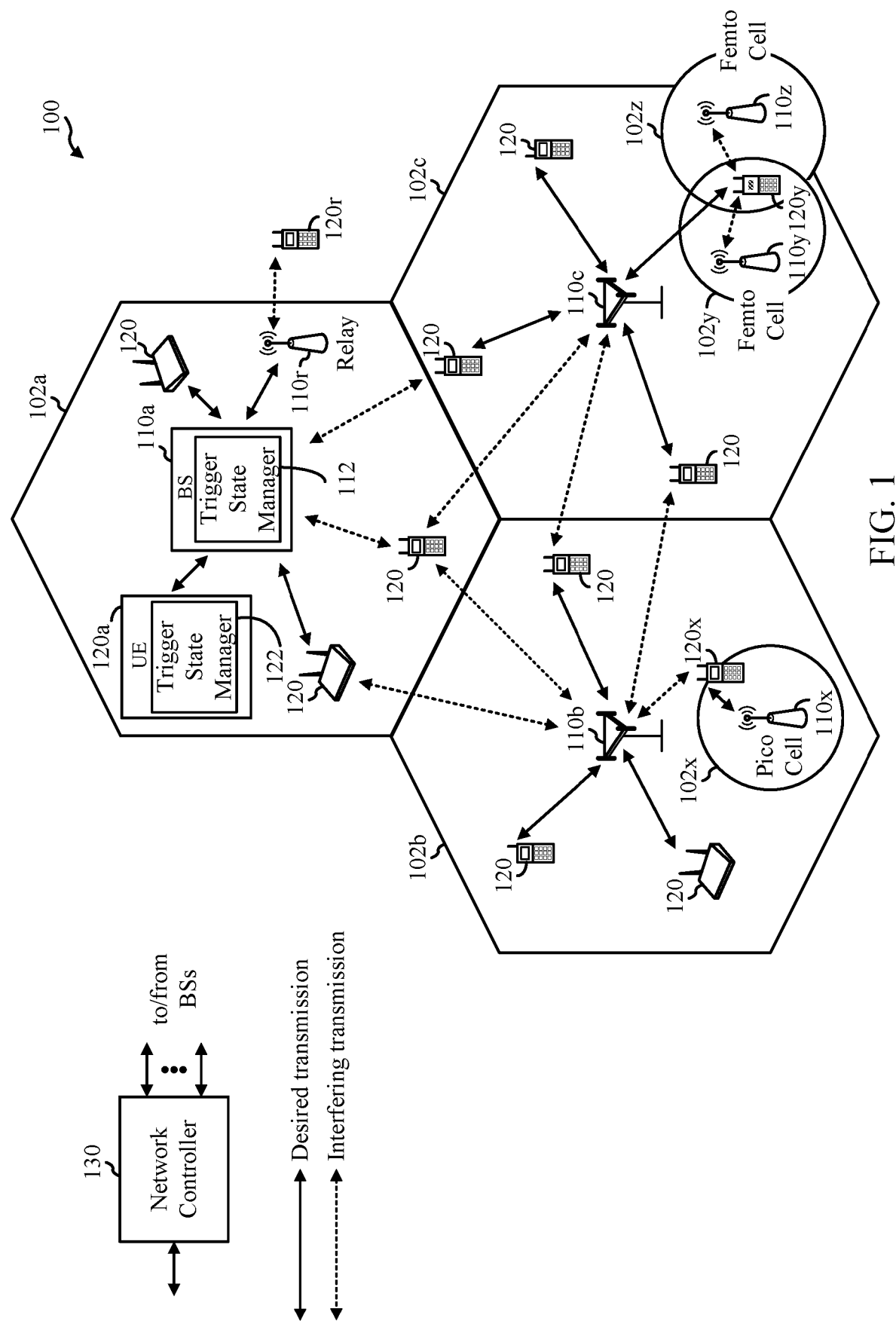
FIG. 1 shows an example wireless communication network in which some aspects of the present disclosure may be performed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for trigger state activation and updating. As shown in FIG. 1, the BS 110a includes a trigger state manager 112. The trigger state manager 112 may be configured to activate one of configured trigger states using DCI or dynamically update one or more parameters of at least one of the trigger states, in accordance with aspects of the present disclosure. As shown in FIG. 1, the UE 120a includes a trigger state manager 122. The trigger state manager 122 may be configured to activate one of configured trigger states using DCI or dynamically update one or more parameters of at least one of the trigger states, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
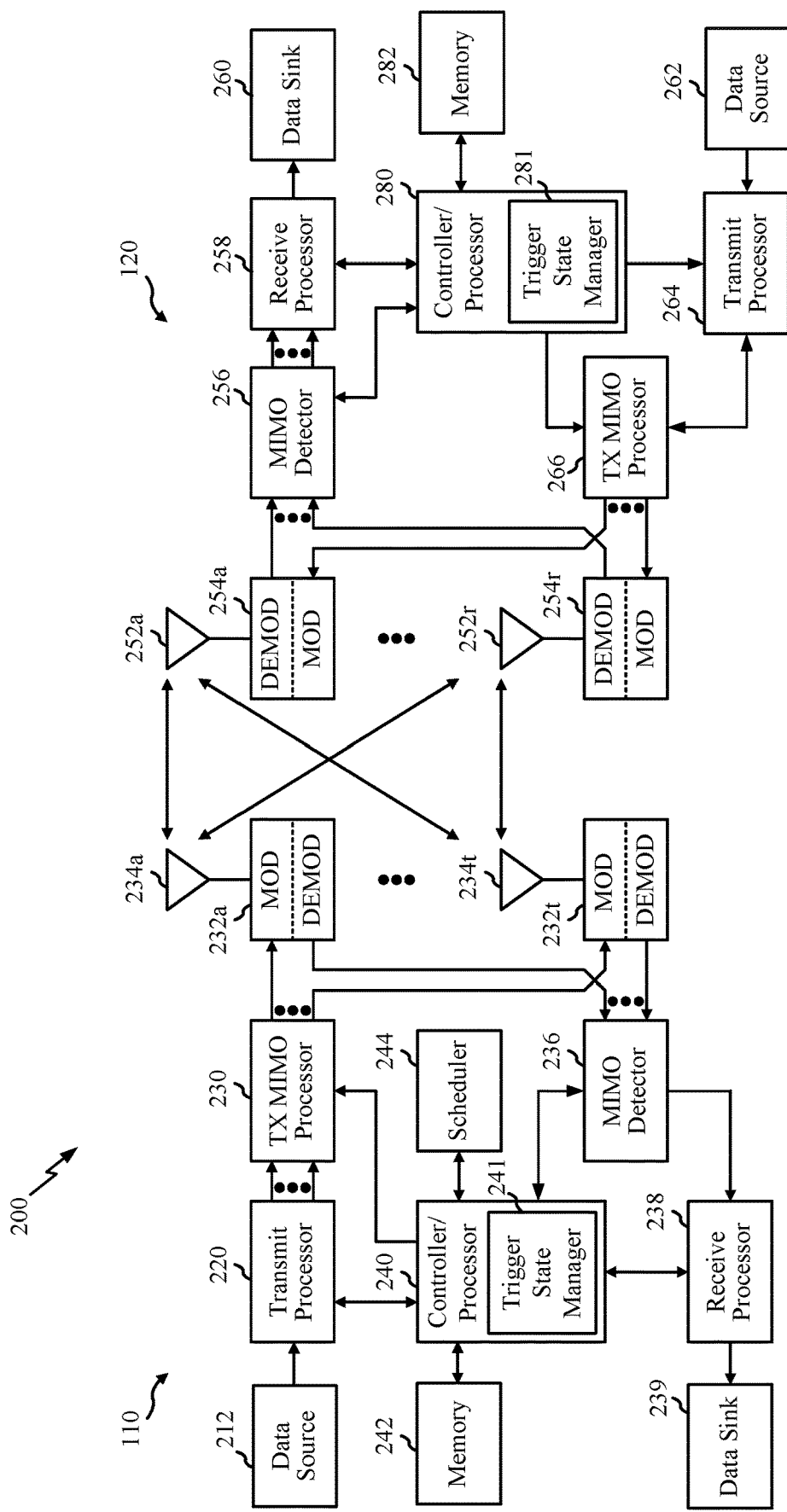
FIG. 2 shows a block diagram illustrating an example base station (BS) and an example user equipment (UE) in accordance with some aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has the trigger state manager 112 that may be configured to activate one of configured trigger states using DCI or dynamically update one or more parameters of at least one of the trigger states, according to aspects described herein. As shown in FIG. 2, the controller/processor 280 of the UE 120a has a trigger state manager 122 that may be configured to activate one of configured trigger states using DCI or dynamically update one or more parameters of at least one of the trigger states, according to aspects described herein. Although shown at the Controller/Processor, other components of the UE 120a and BS 110a may be used performing the operations described herein.

Figure 3:
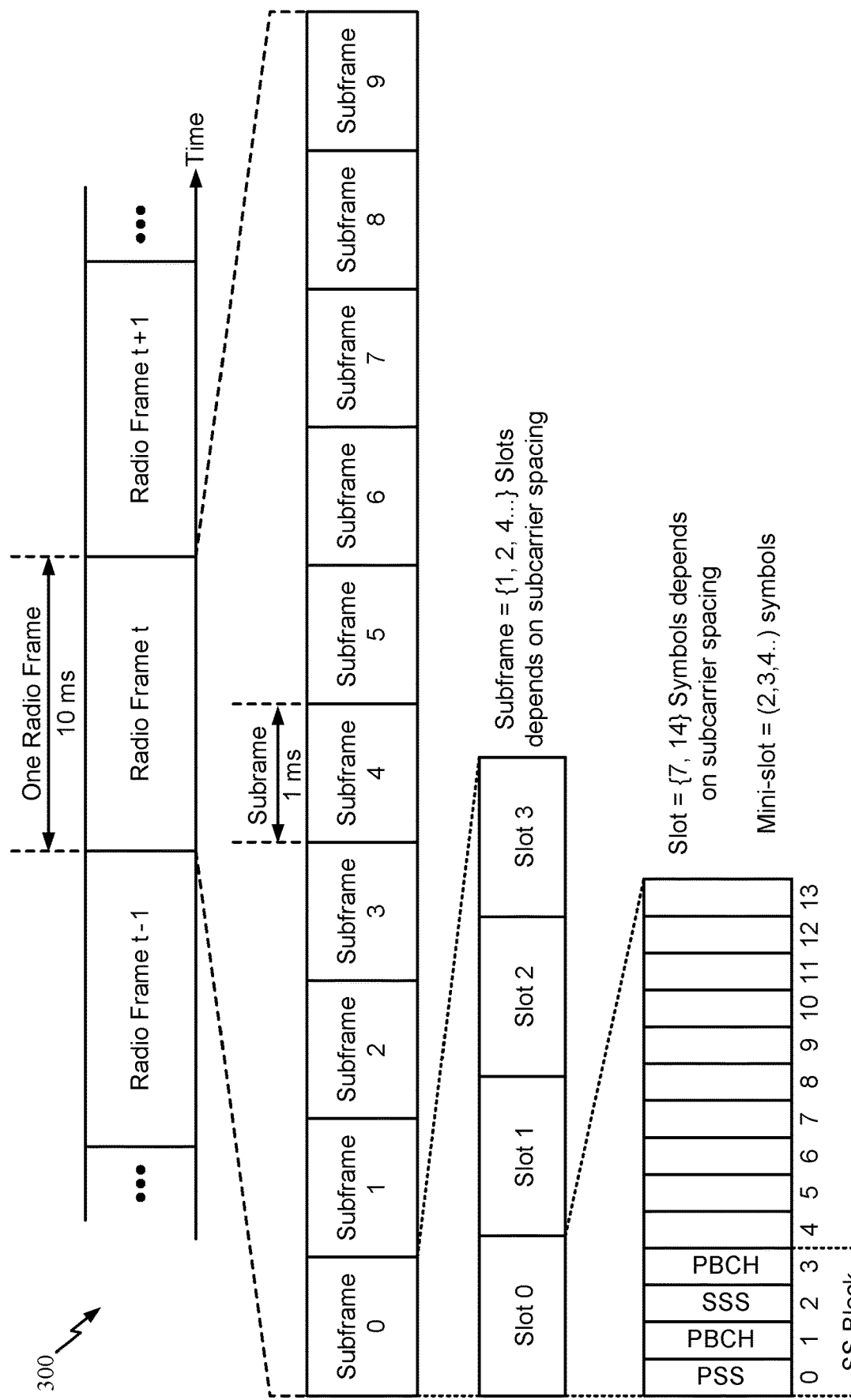
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Methods for DCI-Based Trigger State Activation and Dynamic Trigger State Updating Certain aspects of the present disclosure provide apparatus, methods, processing systems, and computer readable mediums for downlink control information (DCI)-based on trigger stage activation for reporting channel state information (CSI)-reference signal (RS) feedback. Various CSI-RS trigger states may be configured by a base station (BS) using a radio access control (RRC) configuration. For example, for aperiodic CSI, a CSI-AperiodicTriggerStateList field may be used to configured a UE with a list of aperiodic trigger states using RRC signaling. The trigger states may indicate, via an information element (IE), information such as how to report CSI-RS measurement results (e.g., which beam to use or which resource set to use by indicating a resource set ID). The trigger states may also indicate the type of CSI-RS to be transmitted (e.g., non-zero power (NZP) CSI-RS or interference management (IM) CSI-RS). The trigger states may indicate quasi-co location (QCL) information, which may indicate which beam is used for the transmission of the CSI-RS, allowing the UE to receive the CSI-RS more efficiently.

As described herein, a list of trigger states may be configured by RRC signaling. In certain implementations, CSI-RS trigger states may be activated using medium access control (MAC)-control element (CE), which may introduce activation latency (e.g., 3 ms) for UE to apply the activation command. Certain aspects of the present disclosure are directed to DCI-based trigger state activation. For example, CSI-RS trigger state activation may be performed via DCI. The trigger state activation may be performed using either a new DCI format or using an existing DCI format (e.g., format 0_1 or 0_2) by using reserved bits or configurable new fields. In certain aspects, an acknowledgment (ACK)/ negative ACK (NAK) for receiving the DCI may be sent by the UE in uplink (UL) (e.g., via physical uplink control channel (PUCCH) or physical uplink shared channel (PUSCH)).

In certain aspects, the UE may report whether the UE supports DCI-based trigger state activation. In this case, the transmission of the DCI activating a trigger state may be in response to the UE's indication that the UE supports the DCI-based trigger state activation. In some cases, the BS may indicate, to the UE, that DCI-based trigger state activation is enabled, via RRC, MAC-CE, and/or DCI.

Figure 4:
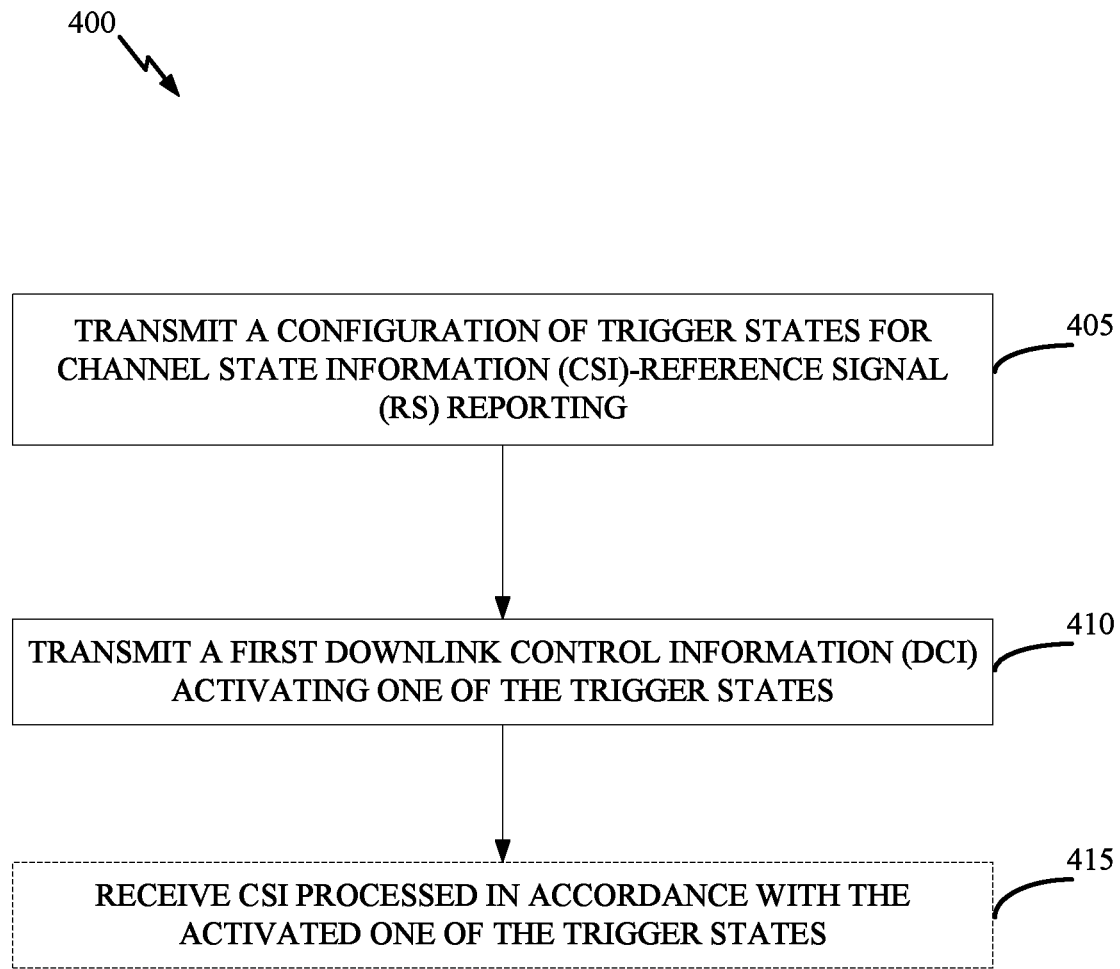
FIG. 4 illustrates example operations for downlink control information (DCI)-based trigger state activation by a BS, in accordance with some aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100).

Operations 400 may be implemented as software components that are executed and run on one or more processors (e.g., controller/processor 240 of FIG. 2). Further, the transmission and reception of signals by the BS in operations x00 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, with the BS transmitting a configuration of trigger states for CSI-RS reporting. At block 410, the BS transmits a first DCI activating one of the trigger states. At block 415, the BS may optionally receive CSI (also referred to as "CSI-RS feedback") processed in accordance with the activated one of the trigger states. In some aspects, the BS may transmit a message (e.g., a MAC-CE or the first DCI) that scheduled reception of the CSI-RS using the activated one of the trigger states.

Figure 5:
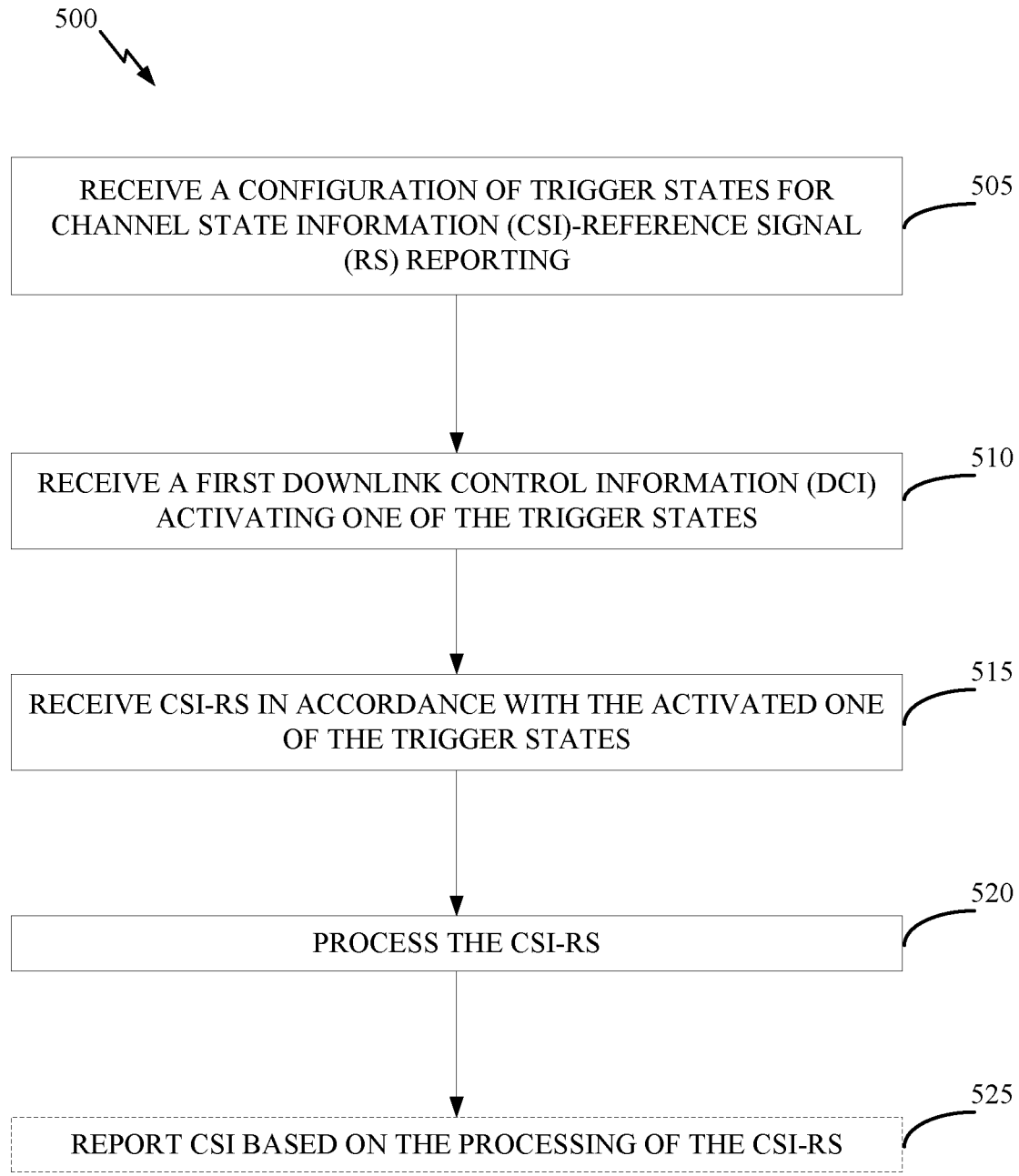
FIG. 5 illustrates example operations for DCI-based trigger state activation by a UE, in accordance with some aspects of the present disclosure.

FIG. 5 is a flow diagram illustrating example operations 500 for wireless communication, in accordance with certain aspects of the present disclosure. The operations 500 may be performed, for example, by a UE (e.g., such as a UE 120a in the wireless communication network 100).

The operations 500 may be complimentary operations by the UE to the operations 400 performed by the BS. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with UE receiving a configuration (e.g., via RRC signaling) of trigger states for CSI-RS reporting (e.g., aperiodic CSI-RS reporting). At block 510, the UE may receive a first DCI activating one of the trigger states. For instance, the first DCI may indicate an index associated with the one of the trigger states. At block 515, the UE may receive the CSI-RS in accordance with the activated one of the trigger states, and at block 520, process the CSI-RS. For example, at block 525, the UE may optionally report CSI based on the processing of the CSI-RS. In some aspects, the UE may also receive a message (e.g., a MAC-CE or the first DCI) that scheduled reception of the CSI-RS using the activated one of the trigger states.

In certain aspects, the UE may generate a message (e.g., PUCCH, or PUSCH) acknowledging reception of the first DCI activating the activated one of the trigger states, and transmit the message to the BS. In certain aspects, the UE may transmit an indication that the UE supports DCI-based trigger state activation. In this case, the reception, at block 510, of the first DCI activating the one of the trigger states may be in response to the support of DCI-based trigger state activation. In certain aspects, the operations 500 may also include receiving an indication that DCI-based trigger state activation is enabled. In this case, the reception, at block 510, of the first DCI activating the one of the trigger states may be in response to the indication that the DCI-based trigger state activation is enabled. In some cases, the indication that the DCI-based trigger state activation is enabled may be received via RRC signaling, MAC-CE message, or a second DCI (e.g., different than the first DCI or the same as the first DCI).

Certain aspects of the present disclosure are directed to dynamic trigger state updating. As described herein, current trigger state content (list) may be RRC configured, but a maximum number (e.g., 64) of configurable trigger state may be too low for certain use cases. For example, P2 beamforming (e.g., AP transmit (Tx) antenna beamforming), P3 beamforming (e.g., UE receive (Rx) antenna beamforming), tracking reference signal (TRS) operations, or any combinations thereof, may be associated with different trigger states, resulting in a high quantity of trigger states, especially when the base station has a large number of transmit beams. Increasing the maximum quantity of configurable trigger states may increase UE memory and complexity, since the UE has to prepare corresponding aperiodic (AP)-CSI-RS Rx beam(s) after a short triggering offset.

Certain aspects of the present disclosure are directed to dynamic trigger state updating. For example, the content of each of one or more trigger states may be dynamically updated by MAC-CE or DCI to reduce latency. For example, instead of configuring new trigger states via RRC signalling, specific parameters of configured trigger states may be updated dynamically via MAC-CE, DCI or both. For instance, a CSI-RS resource set ID and/or QCL per resource of one or more trigger states may be updated. As an example, when the UE is mobile, the applicable beam used to communicate with the UE may change quickly. Thus, the BS may dynamically update the beam for CSI-RS reporting using dynamic signalling (e.g., DCI or MAC-CE), as described herein.

In certain aspects, an ACK/NACK for receiving the update to the one or more trigger states may be sent by the UE in UL (e.g., via PUCCH or PUSCH). In certain aspects, the UE may report whether the UE supports dynamic trigger state updating. In this case, the transmission of the update may be in response to the UE's indication that the UE supports dynamic trigger state updating. In some cases, the BS may indicate, to the UE, that dynamic trigger state updating is enabled, via RRC, MAC-CE, and/or DCI.

Figure 6:
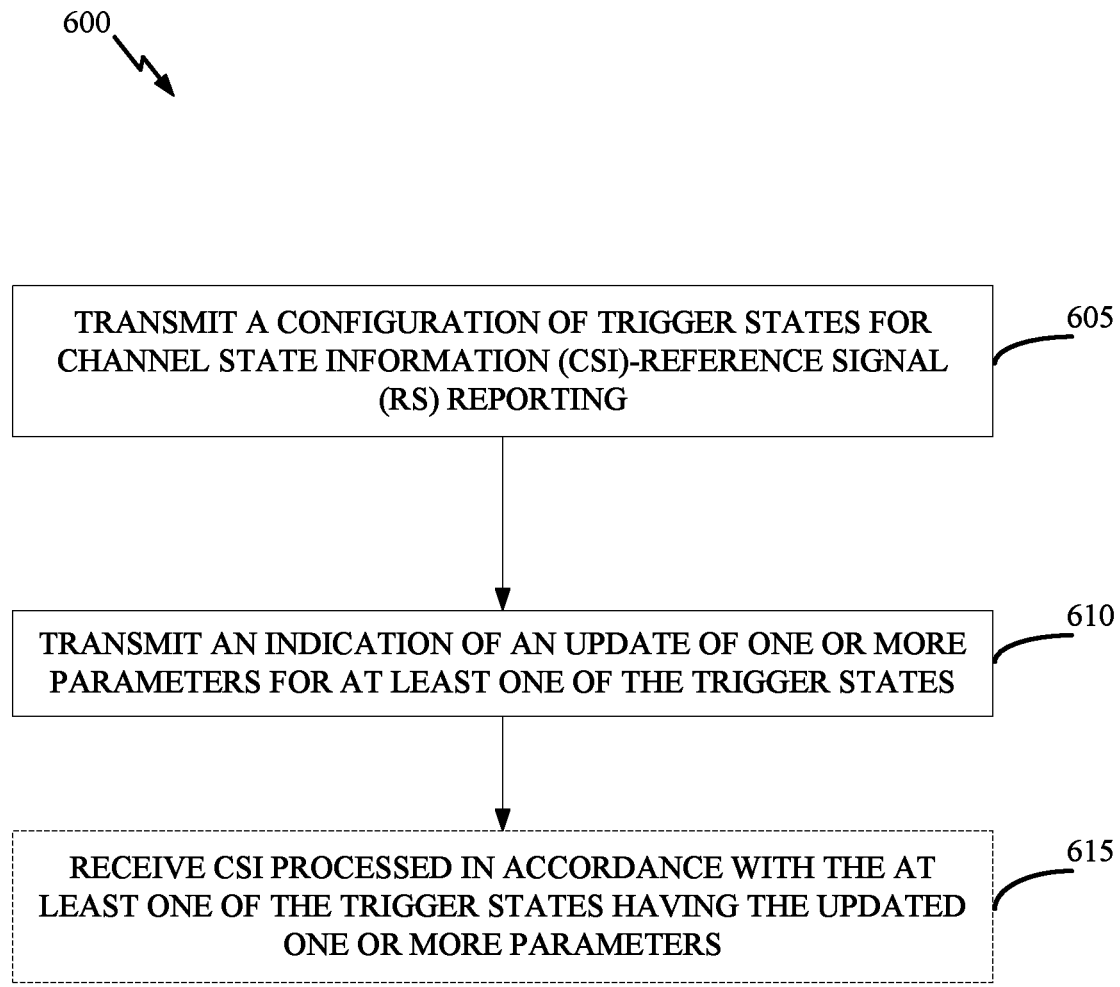
FIG. 6 illustrates example operations for dynamic trigger state updating by BS, in accordance with some aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110a in the wireless communication network 100).

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, with the BS transmitting a configuration of trigger states for CSI-RS reporting. At block 610, the BS transmits an indication of an update of one or more parameters for at least one of the trigger states. At block 615, the BS may optionally receive CSI processed in accordance with the at least one of the trigger states having the updated one or more parameters. In some aspects, the BS may transmit a message (e.g., MAC-CE or DCI) that scheduled reception of the CSI-RS.

Figure 7:
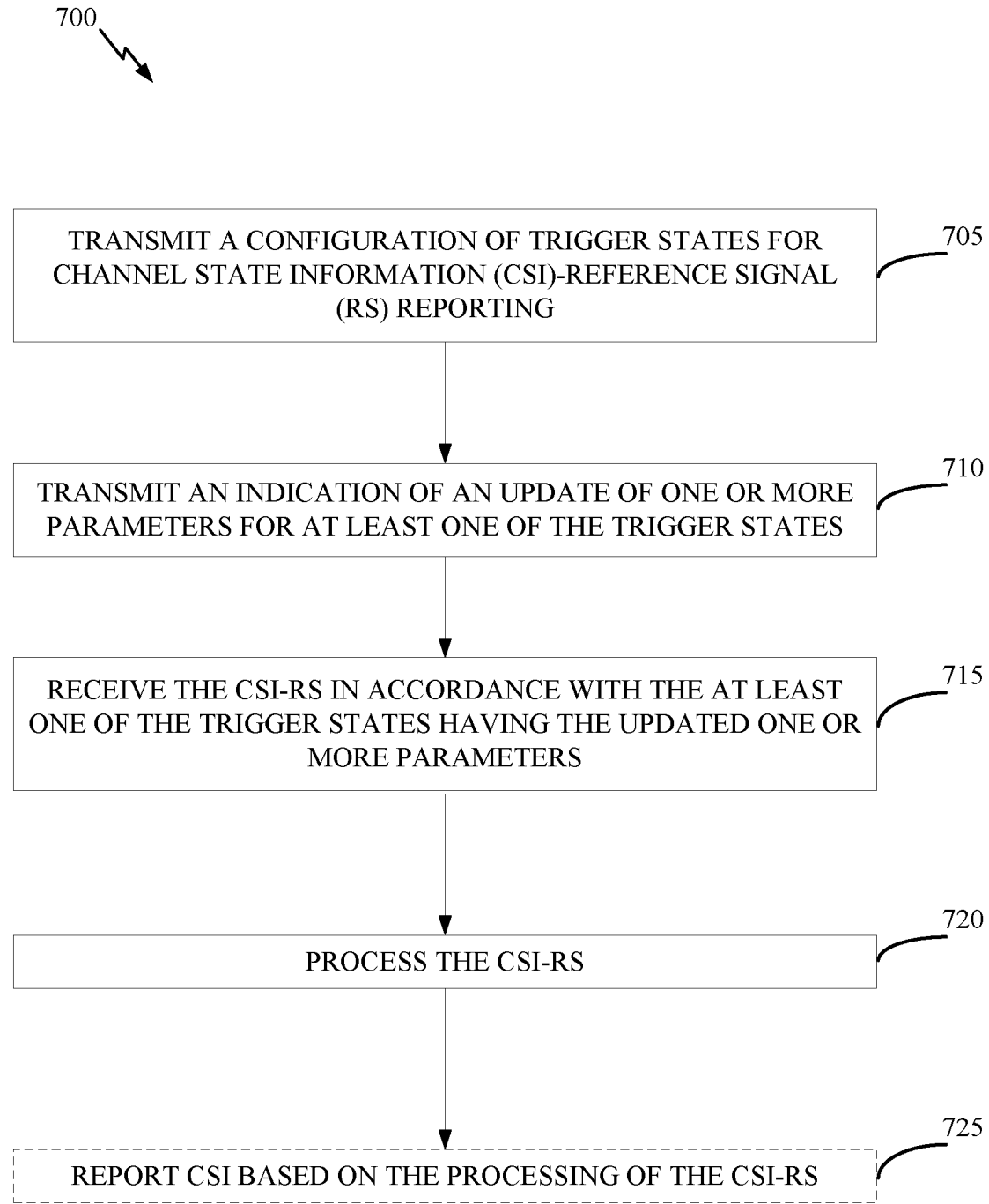
FIG. 7 illustrates example operations for dynamic trigger state updating by a UE, in accordance with some aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120a in the wireless communication network 100).

The operations 700 may be complimentary operations by the UE to the operations 600 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, with the UE receiving a configuration of trigger states for CSI-RS reporting (e.g., aperiodic CSI-RS reporting). In certain aspects, the configuration of the trigger states is received via radio resource control (RRC) signaling. At block 710, the UE may receive an indication of an update of one or more parameters (e.g., resource set ID and/or QCL per resource) for at least one of the trigger states. In certain aspects, the indication of the update of the one or more parameters is received via at least one of a DCI, a MAC-CE, or a combination thereof. At block 715, the UE may receive the CSI-RS in accordance with the at least one of the trigger states having the updated one or more parameters; and at block 720, process the CSI-RS. In certain aspects, at block 725, the UE may optionally report CSI based on the processing of the CSI-RS. In some aspects, the UE may receive a message (e.g., MAC-CE or DCI) that scheduled reception of the CSI-RS.

In certain aspects, the UE may generate a message (e.g., PUCCH or PUSCH) acknowledging reception of the update of the one or more parameters, and transmit the message. In certain aspects, the UE may transmit an indication that the UE supports dynamic trigger state updating, the reception of the update of the one or more parameters for the at least one of the trigger states being in response to the support of dynamic trigger state updating.

In certain aspects, the UE may receive an indication that dynamic trigger state updating is enabled, the reception of the update of the one or more parameters for the at least one of the trigger states being in response to the indication that the dynamic trigger state updating is enabled. In certain implementations, the indication that the dynamic trigger state updating is enabled may be received via RRC signaling, MAC-CE message, or DCI.

Figure 8:
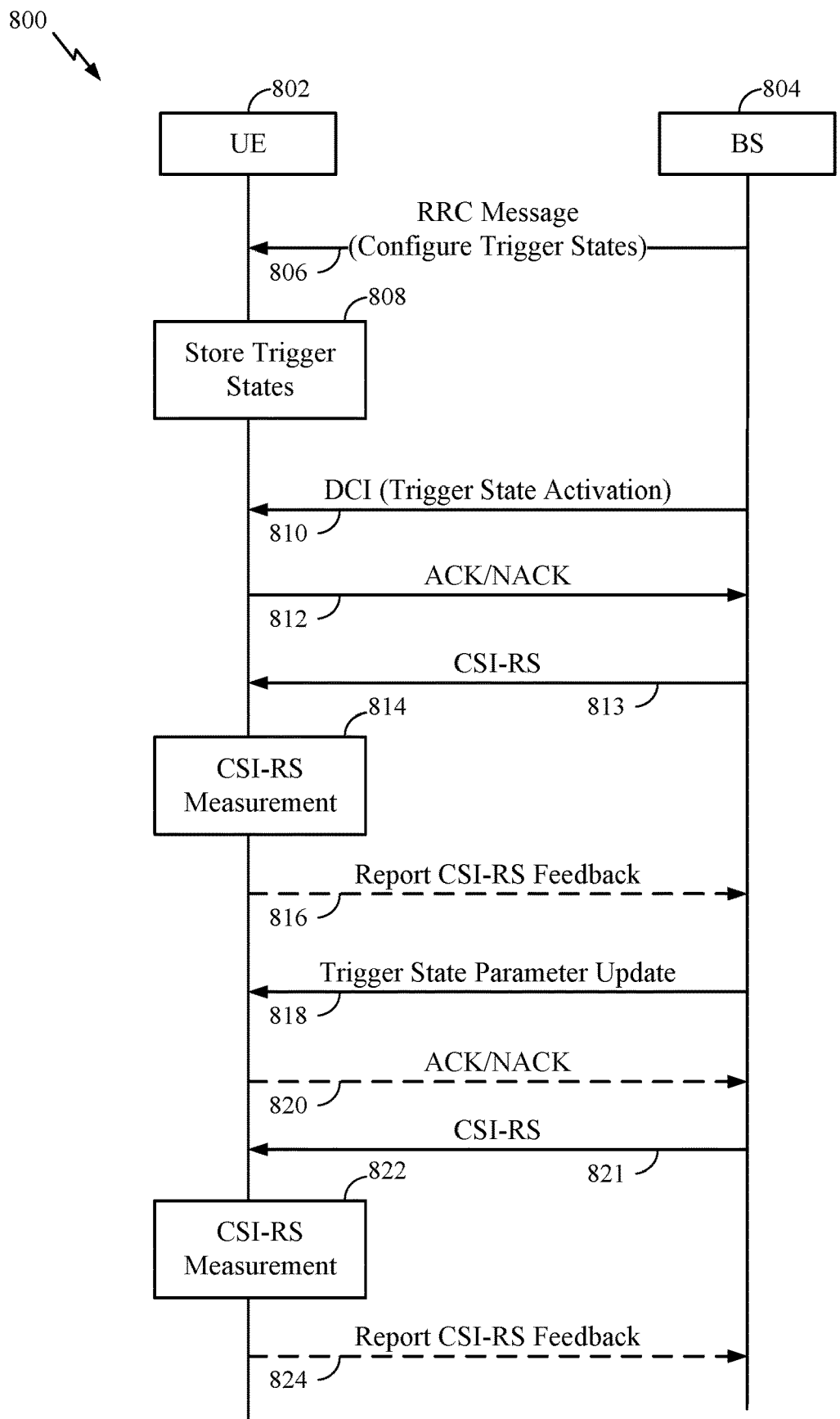
FIG. 8 is a call flow diagram illustrating example operations for DCI-based trigger state activation and dynamic trigger state updating, in accordance with some aspects of the present disclosure.

FIG. 8 is a call flow diagram illustrating example operations 800 for trigger state activation and updating, in accordance with certain aspects of the present disclosure. As illustrated, the BS 804 (e.g., corresponding to BS 110) may transmit an RRC message 806 configuring trigger states. At block 808, the UE 802 may store the trigger states, and receive DCI 810 activing one of the trigger states. The UE may transmit ACK/NACK 812 for the DCI 810 via a PUCCH or PUSCH, as described herein.

The UE may then receive CSI-RS 813 in accordance with the activated trigger state and process the CSI-RS 813. For example, the UE may perform CSI-RS measurement 814. In some aspects, the UE may optionally report CSI-RS feedback 816 (e.g., CSI), in accordance with the activated trigger state.

In certain aspects, a configured trigger state may be updated in a dynamic manner, as described herein. For example, the UE may receive a trigger state parameter update message 818 to update one or more parameters of at least one of the trigger states. The trigger state parameter update message 818 may be a DCI or MAC-CE. The UE may optionally transmit ACK/NACK 820 for the trigger state parameter update message 818. The UE may receive CSI-RS 821, and perform CSI-RS measurement 822, as illustrated. Optionally, the UE may also report CSI-RS feedback 824 in accordance with the updated trigger state.

Figure 9:
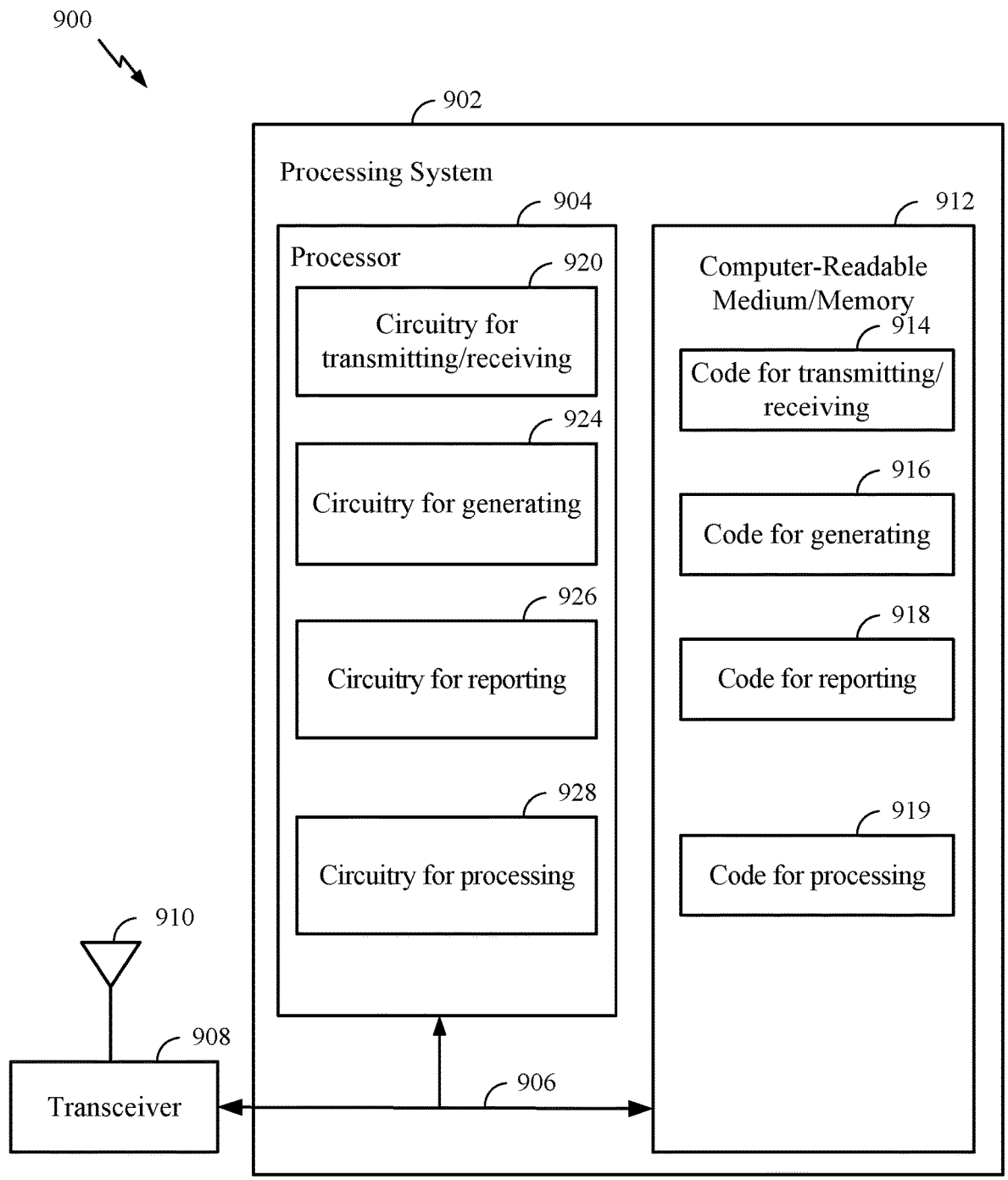
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIGS. 4 and 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 4 and 6, or other operations for performing the various techniques discussed herein for DCI-based trigger state activation or dynamic trigger state updating.

In certain aspects, computer-readable medium/memory 912 stores one or any combination of code 914 (e.g., an example of means for) for transmitting/receiving (e.g., receiving or transmitting CSI-RS); code 916 (e.g., an example of means for) for generating, code 918 (e.g., an example of means for) for reporting (e.g., reporting CSI), and code 919 (e.g., an example of means for) for processing (e.g., processing CSI-RS). One or more of code 914, 916, 918, 919 may be executed by a general-purpose processor, a digital signal processor (DSP), an application-specific integrated circuit (ASIC), a field programmable gate array (FPGA) or other programmable logic device. In certain aspects, the processor 904 executes the code stored in the computer-readable medium/memory 912. In certain aspects, computer-readable medium/memory 912 is an example of the trigger state manager 112 or 122.

In certain aspects, alternatively or additionally, the processor 904 includes one or any combination of circuitry 920 (e.g., an example of means for) for transmitting/receiving (e.g., receiving or transmitting CSI-RS); circuitry 924 (e.g., an example of means for) for generating, and circuitry 926 (e.g., an example of means for) for reporting (e.g., reporting CSI), and circuitry 928 (e.g., an example of means for) for processing (e.g., processing CSI-RS). One or more of circuitry 920, 924, 926, 928 may be implemented by one or more of a general-purpose processor, a digital signal processor (DSP), an application-specific integrated circuit (ASIC), a field programmable gate array (FPGA) or other programmable logic device. In certain aspects, processor 904 is an example of the trigger state manager 112 or 122.

The transceiver 908 may provide a means for receiving information or signals such as CSI-RS or CSI. Information may be passed on to other components of the device 900. The transceiver 908 may be an example of aspects of the transceiver 254 described with reference to FIG. 2. The antenna 910 may correspond to a single antenna or a set of antennas. The transceiver 908 may provide means for transmitting signals generated by other components of the device 900.

Figure 10:
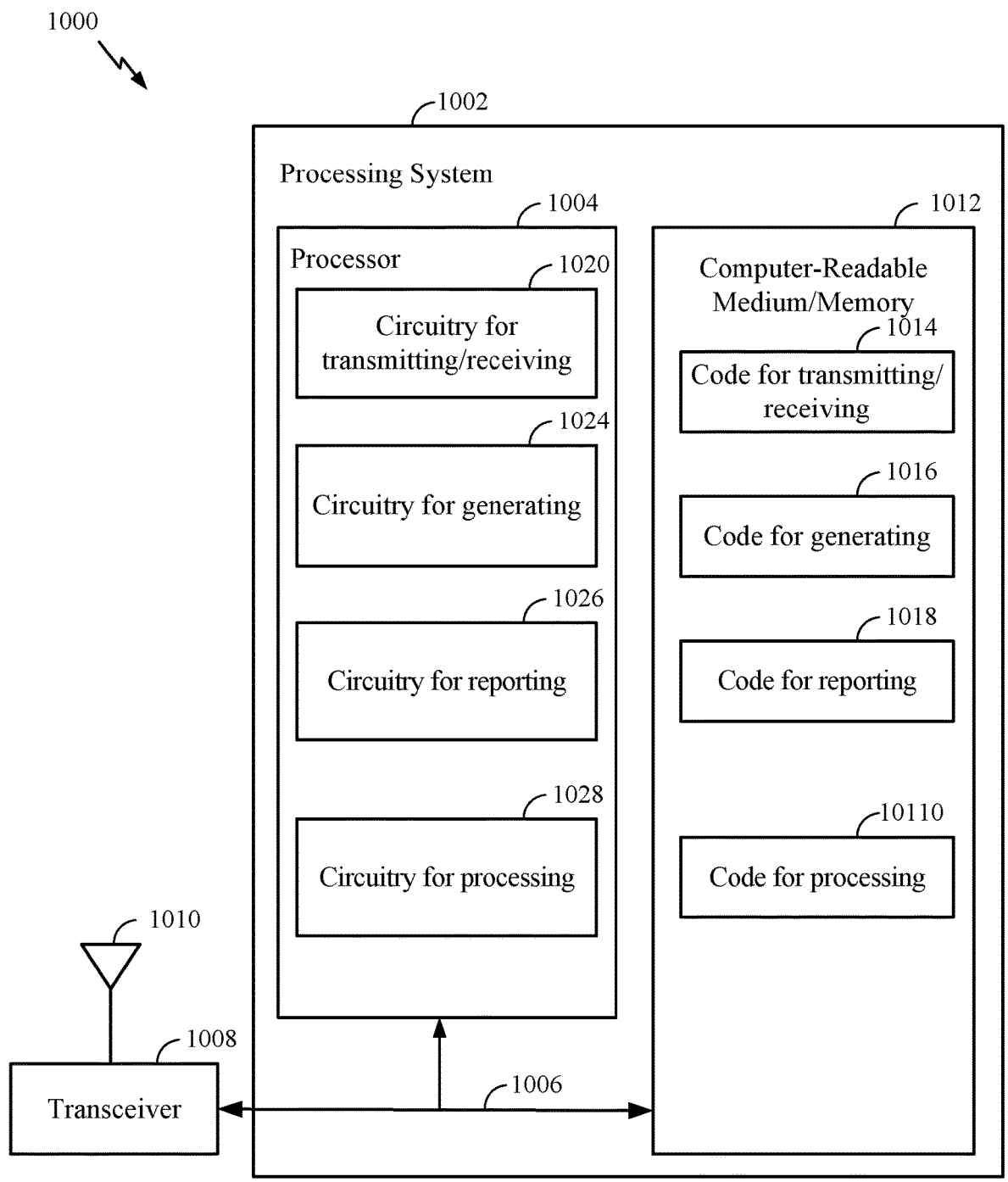
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIGS. 5 and 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 5 and 7, or other operations for performing the various techniques discussed herein for DCI-based trigger state activation or dynamic trigger state updating.

In certain aspects, computer-readable medium/memory 1012 stores one or any combination of code 1014 (e.g., an example of means for) for transmitting/receiving (e.g., receiving or transmitting CSI-RS); code 1016 (e.g., an example of means for) for generating, code 1018 (e.g., an example of means for) for reporting (e.g., reporting CSI), and code 10110 (e.g., an example of means for) for processing (e.g., processing CSI-RS). One or more of code 1014, 1016, 1018, 10110 may be executed by a general-purpose processor, a digital signal processor (DSP), an application-specific integrated circuit (ASIC), a field programmable gate array (FPGA) or other programmable logic device. In certain aspects, the processor 1004 executes the code stored in the computer-readable medium/memory 1012. In certain aspects, computer-readable medium/memory 1012 is an example of the trigger state manager 112 or 122.

In certain aspects, alternatively or additionally, the processor 1004 includes one or any combination of circuitry 1020 (e.g., an example of means for) for transmitting/receiving (e.g., receiving or transmitting CSI-RS); circuitry 1024 (e.g., an example of means for) for generating, and circuitry 1026 (e.g., an example of means for) for reporting (e.g., reporting CSI), and circuitry 1028 (e.g., an example of means for) for processing (e.g., processing CSI-RS). One or more of circuitry 1020, 1024, 1026, 1028 may be implemented by one or more of a general-purpose processor, a digital signal processor (DSP), an application-specific integrated circuit (ASIC), a field programmable gate array (FPGA) or other programmable logic device. In certain aspects, processor 1004 is an example of the trigger state manager 112 or 122.

The transceiver 1008 may provide a means for receiving information or signals such as CSI-RS or CSI. Information may be passed on to other components of the device 1000. The transceiver 1008 may be an example of aspects of the transceiver 254 described with reference to FIG. 2. The antenna 1010 may correspond to a single antenna or a set of antennas. The transceiver 1008 may provide means for transmitting signals generated by other components of the device 1000.

The trigger state manager 112 or 122 may support wireless communication in accordance with examples as disclosed herein.

The trigger state manager 112 or 122 may be an example of means for performing various aspects described herein. The trigger state manager 112 or 122, or its sub-components, may be implemented in hardware (e.g., in trigger state management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the trigger state manager 112 or 122, or its sub-components, may be implemented in code (e.g., as trigger state management software or firmware) executed by a processor, or any combination thereof. If implemented in code executed by a processor, the functions of the trigger state manager 112 or 122, or its sub-components may be executed by a general-purpose processor, a digital signal processor (DSP), an application-specific integrated circuit (ASIC), a field programmable gate array (FPGA) or other programmable logic device.

In some examples, the trigger state manager 112 or 122 may be configured to perform various operations (e.g., receiving, determining, transmitting) using or otherwise in cooperation with the transceiver 908.

The trigger state manager 112 or 122, or its sub-components, may be physically located at various positions, including being distributed such that portions of functions are implemented at different physical locations by one or more physical components. In some examples, the trigger state manager 112 or 122, or its sub-components, may be a separate and distinct component in accordance with various aspects of the present disclosure. In some examples, the trigger state manager 112 or 122, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Example Aspects

Aspect 1. A method for wireless communication by a user equipment (UE), comprising: receiving a configuration of trigger states for channel state information (CSI)-reference signal (RS) reception; receiving a first downlink control information (DCI) activating one of the trigger states; receiving CSI-RS in accordance with the activated one of the trigger states; and processing the CSI-RS.

Aspect 2. The method of aspect 1, further comprising reporting CSI based on the processing of the CSI-RS.

Aspect 3. The method of one of aspects 1-2, further comprising receiving a message that scheduled reception of the CSI-RS using the activated one of the trigger states.

Aspect 4. The method of one of aspects 1-3, further comprising: generating a message acknowledging reception of the first DCI activating the one of the trigger states; and transmitting the message.

Aspect 5. The method of one of aspects 1-4, further comprising transmitting an indication that the UE supports DCI-based trigger state activation, wherein the reception of the first DCI activating the one of the trigger states is in response to the support of DCI-based trigger state activation.

Aspect 6. The method of one of aspects 1-5, further comprising receiving an indication that DCI-based trigger state activation is enabled, wherein the reception of the first DCI activating the one of the trigger states is in response to the indication that the DCI-based trigger state activation is enabled.

Aspect 7. The method of aspect 6, wherein the indication that the DCI-based trigger state activation is enabled is received via RRC signaling, MAC-CE message, or a second DCI.

Aspect 8. The method of aspect 7, wherein the second DCI is different than the first DCI.

Aspect 9. The method of one of aspects 4-8, wherein the message is transmitted via a physical uplink control channel (PUCCH) or a physical uplink shared channel (PUSCH).

Aspect 10. The method of one of aspects 1-9, wherein the CSI-RS reporting comprises aperiodic CSI-RS reporting.

Aspect 11. The method of one of aspects 1-10, wherein the first DCI indicates an index associated with the one of the trigger states.

Aspect 12. The method of one of aspects 1-11, wherein the configuration of the trigger states is received via radio resource control (RRC) signaling.

Aspect 13. A method for wireless communication, comprising: transmitting a configuration of trigger states for channel state information (CSI)-reference signal (RS) reporting; and transmitting a first downlink control information (DCI) activating one of the trigger states.

Aspect 14. The method of aspect 13, further comprising receiving CSI processed in accordance with the activated one of the trigger states.

Aspect 15. The method of one of aspects 13-14, further comprising transmitting a message that scheduled reception of the CSI-RS using the activated one of the trigger states.

Aspect 16. The method of one of aspects 13-15, further comprising receiving a message acknowledging reception of the first DCI activating the one of the trigger states.

Aspect 17. The method of one of aspects 13-16, further comprising receiving an indication that a user equipment (UE) supports DCI-based trigger state activation, wherein the transmission of the first DCI activating the one of the trigger states is in response to the support of DCI-based trigger state activation.

Aspect 18. The method of one of aspects 13-17, further comprising transmitting an indication that DCI-based trigger state activation is enabled, wherein the transmission of the first DCI activating the one of the trigger states is in response to the indication that the DCI-based trigger state activation is enabled.

Aspect 19. The method of aspect 18, wherein the indication that the DCI-based trigger state activation is enabled is transmitted via RRC signaling, MAC-CE message, or a second DCI.

Aspect 20. The method of aspect 19, wherein the second DCI is different than the first DCI.

Aspect 21. The method of aspect 16, wherein the message is received via a physical uplink control channel (PUCCH) or a physical uplink shared channel (PUSCH).

Aspect 22. The method of one of aspects 13-21, wherein the CSI-RS reporting comprises aperiodic CSI-RS reporting.

Aspect 23. The method of one of aspects 13-22, wherein the first DCI indicates an index associated with the one of the trigger states.

Aspect 24. The method of one of aspects 13-23, wherein the configuration of the trigger states is received via radio resource control (RRC) signaling.

Aspect 25. A method for wireless communication by a user equipment (UE), comprising: receiving a configuration of trigger states for channel state information (CSI)-reference signal (RS) reporting; receiving an indication of an update of one or more parameters for at least one of the trigger states; receiving CSI-RS in accordance with the at least one of the trigger states having the updated one or more parameters; and processing the CSI-RS.

Aspect 26. The method of aspect 25, further comprising reporting CSI based on the processing of the CSI-RS.

Aspect 27. The method of one of aspects 25-26, further comprising receiving a message that scheduled reception of the CSI-RS.

Aspect 28. The method of one of aspects 25-27, wherein the one or more parameters comprises at least one of CSI-RS resource set ID, quasi-co location (QCL) per resource, or any combination thereof.

Aspect 29. The method of one of aspects 25-28, further comprising: generating a message acknowledging reception of the update of the one or more parameters; and transmitting the message.

Aspect 30. The method of one of aspects 25-29, further comprising transmitting an indication that the UE supports dynamic trigger state updating, wherein the reception of the update of the one or more parameters for the at least one of the trigger states is in response to the support of dynamic trigger state updating.

Aspect 31. The method of one of aspects 25-30, further comprising receiving an indication that dynamic trigger state updating is enabled, wherein the reception of the update of the one or more parameters for the at least one of the trigger states is in response to the indication that the dynamic trigger state updating is enabled.

Aspect 32. The method of aspect 31, wherein the indication that the dynamic trigger state updating is enabled is received via RRC signaling, MAC-CE message, or DCI.

Aspect 33. The method of one of aspects 29-32, wherein the message is transmitted via a physical uplink control channel (PUCCH) or a physical uplink shared channel (PUSCH).

Aspect 34. The method of one of aspects 25-33, wherein the indication of the update of the one or more parameters is received via at least one of a downlink control information (DCI), a medium access control (MAC)-control element (CE), or a combination thereof.

Aspect 35. The method of one of aspects 25-34, wherein the CSI-RS reporting comprises aperiodic CSI-RS reporting.

Aspect 36. The method of one of aspects 25-35, wherein the configuration of the trigger states is received via radio resource control (RRC) signaling.

Aspect 37. A method for wireless communication, comprising: transmitting a configuration of trigger states for channel state information (CSI)-reference signal (RS) reporting; and transmitting an indication of an update of one or more parameters for at least one of the trigger states.

Aspect 38. The method of aspect 37, further comprising receiving CSI processed in accordance with the at least one of the trigger states having the updated one or more parameters.

Aspect 39. The method of one of aspects 37-38, further comprising transmitting a message that scheduled reception of the CSI-RS.

Aspect 40. The method of one of aspects 37-39, further comprising receiving an indication that the UE supports dynamic trigger state updating, wherein the transmission of the update of the one or more parameters for the at least one of the trigger states is in response to the support of dynamic trigger state updating.

Aspect 41. The method of one of aspects 37-40, further comprising transmitting an indication that dynamic trigger state updating is enabled, wherein the transmission of the update of the one or more parameters for the at least one of the trigger states is in response to the indication that the dynamic trigger state updating is enabled.

Aspect 42. The method of aspect 41, wherein the indication that the dynamic trigger state updating is enabled is received via RRC signaling, MAC-CE message, or DCI.

Aspect 43. The method of one of aspects 37-42, wherein the one or more parameters comprises at least one of CSI-RS resource set ID, quasi-co location (QCL) per resource, or any combination thereof.

Aspect 44. The method of one of aspects 37-43, further comprising receiving a message acknowledging reception of the update of the one or more parameters.

Aspect 45. The method of aspect 44, wherein the message is received via a physical uplink control channel (PUCCH) or a physical uplink shared channel (PUSCH).

Aspect 46. The method of one of aspects 37-45, wherein the indication of the update of the one or more parameters is received via at least one of a downlink control information (DCI), a medium access control (MAC)-control element (CE), or a combination thereof.

Aspect 47. The method of one of aspects 37-46, wherein the CSI-RS reporting comprises aperiodic CSI-RS reporting.

Aspect 48. The method of one of aspects 37-47, wherein the configuration of the trigger states is received via radio resource control (RRC) signaling.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. A user equipment (UE), comprising:
a memory; and
at least one processor coupled to the memory, wherein the at least one processor is configured to:
receive a configuration of trigger states for channel state information (CSI)-reference signal (RS) reception;
transmit an indication that the UE supports DCI-based trigger state activation;
receive a first downlink control information (DCI) activating one of the trigger states, based on the support of DCI-based trigger state activation;
receive CSI-RS in accordance with the activated one of the trigger states; and
process the CSI-RS.

2. The UE of claim 1, wherein the at least one processor is further configured to report CSI based on the processing of the CSI-RS.

3. The UE of claim 1, wherein the at least one processor is further configured to receive a message that scheduled reception of the CSI-RS using the activated one of the trigger states.

4. The UE of claim 1, wherein the at least one processor is further configured to:
generate a message acknowledging reception of the first DCI activating the one of the trigger states; and
transmit the message.

5. The UE of claim 1, wherein the first DCI indicates an index associated with the one of the trigger states.

6. A user equipment (UE), comprising:
a memory; and
at least one processor coupled to the memory, wherein the at least one processor is configured to:
receive a configuration of trigger states for channel state information (CSI)-reference signal (RS) reception;
receive an indication that DCI-based trigger state activation is enable;
receive a first downlink control information (DCI) activating one of the trigger states based on the indication that the DCI-based trigger state activation is enable;
receive CSI-RS in accordance with the activated one of the trigger states; and
process the CSI-RS.

7. A network entity, comprising:
a memory; and
at least one processor coupled to the memory, wherein the at least one processor is configured to:
transmit a configuration of trigger states for channel state information (CSI)-reference signal (RS) reporting;
receive an indication that a user equipment (UE) supports DCI-based trigger state activation; and
transmit a first downlink control information (DCI) activating one of the trigger states based on the support of DCI-based trigger state activation.

8. The network entity of claim 7, wherein the at least one processor is further configured to receive CSI processed in accordance with the activated one of the trigger states.

9. The network entity of claim 7, wherein the at least one processor is further configured to transmit a message that scheduled reception of CSI-RS using the activated one of the trigger states.

10. The network entity of claim 7, wherein the at least one processor is further configured to receive a message acknowledging reception of the first DCI activating the one of the trigger states.

11. The network entity of claim 7, wherein the first DCI indicates an index associated with the one of the trigger states.

12. A network entity, comprising:
a memory; and
at least one processor coupled to the memory, wherein the at least one processor is configured to:
transmit a configuration of trigger states for channel state information (CSI)-reference signal (RS) reporting;
transmit an indication that DCI-based trigger state activation is enable; and
transmit a first downlink control information (DCI) activating one of the trigger states based on the indication that the DCI-based trigger state activation is enabled.

13. A user equipment (UE), comprising:
a memory; and
at least one processor coupled to the memory, wherein the at least one processor is configured to:
receive a configuration of trigger states for channel state information (CSI)-reference signal (RS) reporting;
transmit an indication that the UE supports dynamic trigger state updating;
receive an indication of an update of one or more parameters for at least one of the trigger states based on the support of dynamic trigger state updating;
receive CSI-RS in accordance with the at least one of the trigger states having the updated one or more parameters; and
process the CSI-RS.

14. The UE of claim 13, wherein the at least one processor is further configured to report CSI based on the processing of the CSI-RS.

15. The UE of claim 13, wherein the at least one processor is further configured to receive a message that scheduled reception of the CSI-RS.

16. The UE of claim 13, wherein the one or more parameters comprises at least one of CSI-RS resource set ID, quasi-co location (QCL) per resource, or any combination thereof.

17. The UE of claim 13, wherein the at least one processor is further configured to:
generate a message acknowledging reception of the update of the one or more parameters; and
transmit the message.

18. The UE of claim 13, wherein the indication of the update of the one or more parameters is received via at least one of a downlink control information (DCI), a medium access control (MAC)-control element (CE), or a combination thereof.

19. The method of claim 13, further comprising A user equipment (UE), comprising:
a memory; and
at least one processor coupled to the memory, wherein the at least one processor is configured to:
receive a configuration of trigger states for channel state information (CSI)-reference signal (RS) reporting;
receive an indication that dynamic trigger state updating is enabled;
receive an indication of an update of one or more parameters for at least one of the trigger states based on the indication that the dynamic trigger state updating is enabled;
receive CSI-RS in accordance with the at least one of the trigger states having the updated one or more parameters; and
process the CSI-RS.

20. A network entity, comprising:
a memory; and
at least one processor coupled to the memory, wherein the at least one processor is configured to:
transmit a configuration of trigger states for channel state information (CSI)-reference signal (RS) reporting;
receive an indication that a user equipment (UE) supports dynamic trigger state updating; and
transmit an indication of an update of one or more parameters for at least one of the trigger states based on the support of dynamic trigger state updating.

21. The network entity of claim 20, wherein the at least one processor is further configured to receive CSI processed in accordance with the at least one of the trigger states having the updated one or more parameters.

22. The network entity of claim 20, wherein the at least one processor is further configured to transmit a message that scheduled reception of CSI-RS.

23. The network entity of claim 20, wherein the one or more parameters comprises at least one of CSI-RS resource set ID, quasi-co location (QCL) per resource, or any combination thereof.

24. The network entity of claim 20, wherein the at least one processor is further configured to receive a message acknowledging reception of the update of the one or more parameters.

25. The network entity of claim 20, wherein the indication of the update of the one or more parameters is received via at least one of a downlink control information (DCI), a medium access control (MAC)-control element (CE), or a combination thereof.

26. The method of claim 20, further comprising A network entity, comprising:
a memory; and
at least one processor coupled to the memory, wherein the at least one processor is configured to:
transmit a configuration of trigger states for channel state information (CSI)-reference signal (RS) reporting;
transmit an indication that dynamic trigger state updating is enabled; and
transmit an indication of an update of one or more parameters for at least one of the trigger states based on the indication that the dynamic trigger state updating is enabled.

* * * * *